Figure 1:
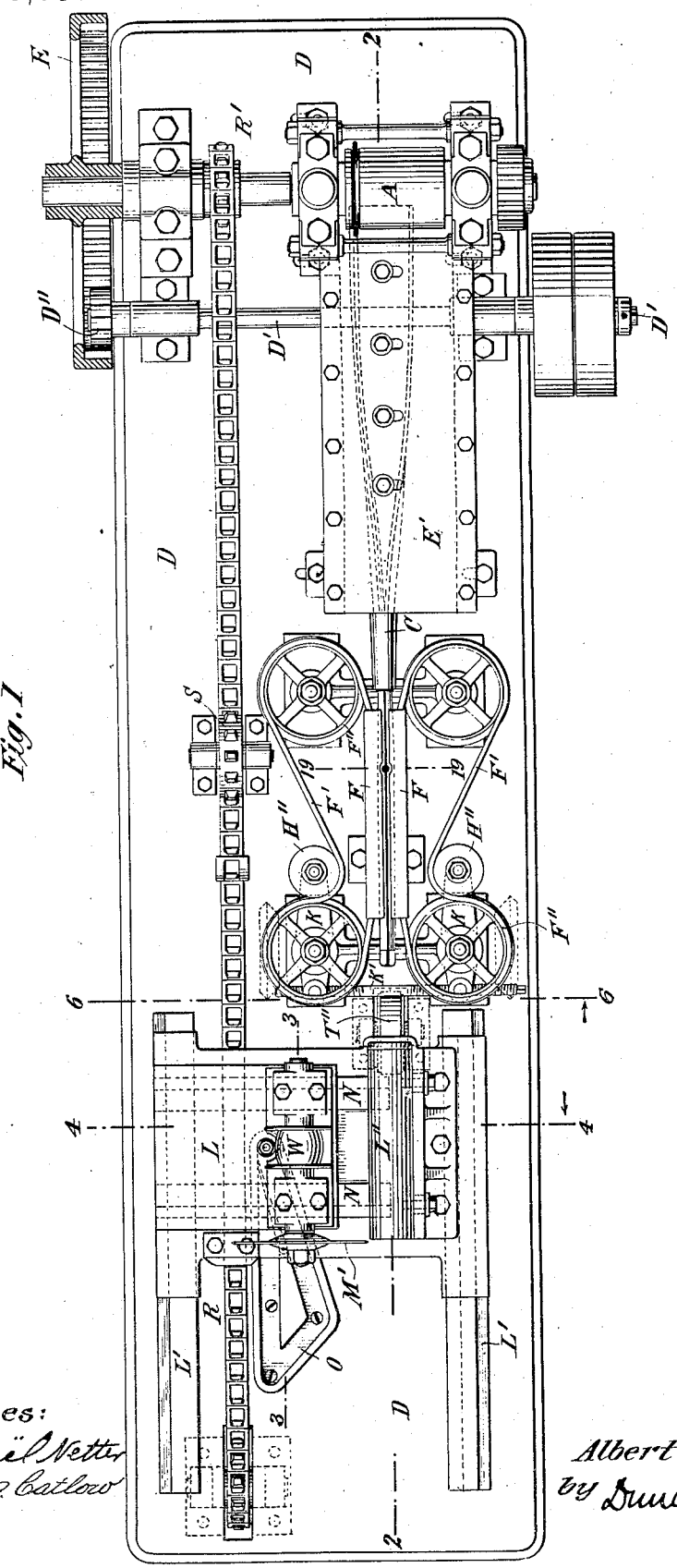

(No Model.)  6 Sheets—Sheet 1.

A. F. MADDEN.
MACHINE FOR MAKING METAL SHADE ROLLERS.

No. 556,857. Patented Mar. 24, 1896.

Fig. I

Witnesses:
Raphael Netter
James M. Catlow

Inventor
Albert F. Madden
by Duncan & Page,
Att'ys.

(No Model.) 6 Sheets—Sheet 2.

A. F. MADDEN.
MACHINE FOR MAKING METAL SHADE ROLLERS.

No. 556,857. Patented Mar. 24, 1896.

Witnesses:
Raphaël Netter
James N. Catlow

Inventor
Albert F. Madden
by Duncan & Page
Attorneys.

(No Model.) 6 Sheets—Sheet 3.
A. F. MADDEN.
MACHINE FOR MAKING METAL SHADE ROLLERS.
No. 556,857. Patented Mar. 24, 1896.
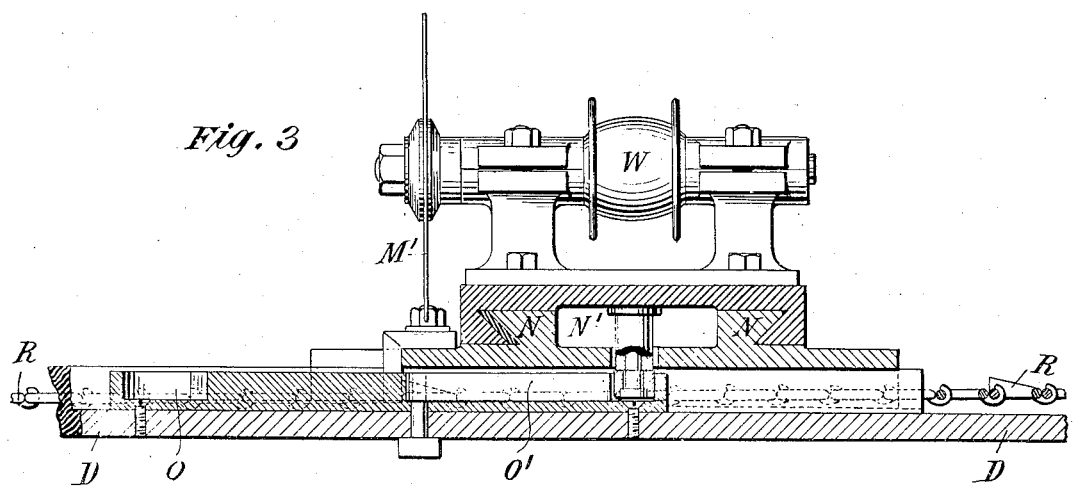
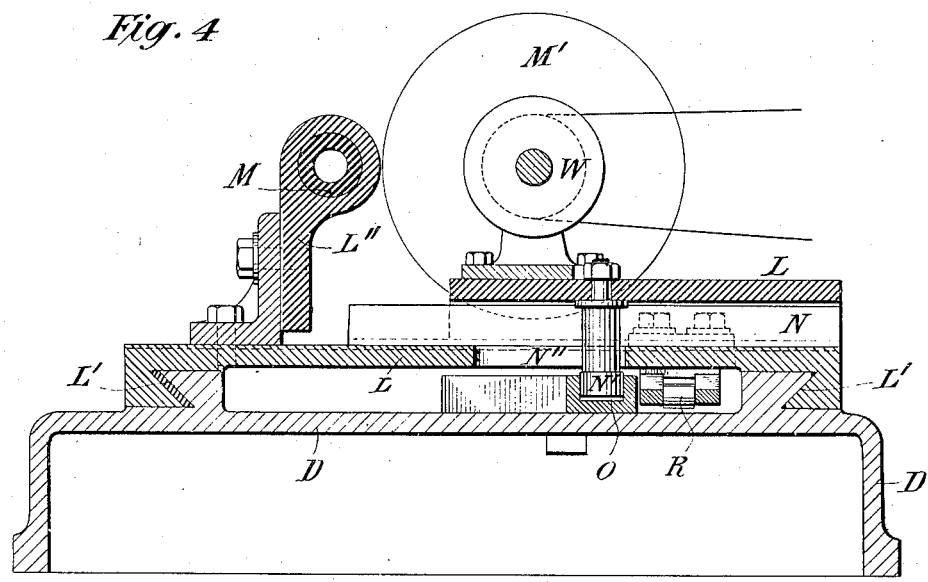
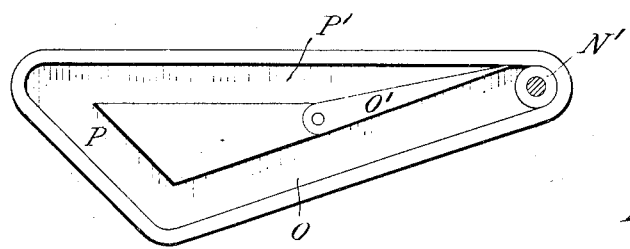
Witnesses:
Raphaël Netter
James M. Callow
Inventor
Albert F. Madden
by Duncan & Page
Attorneys (No Model.) 6 Sheets—Sheet 4.

A. F. MADDEN.
MACHINE FOR MAKING METAL SHADE ROLLERS.

No. 556,857. Patented Mar. 24, 1896.

Witnesses:
Raphaël Netter
James N. Catlow

Inventor
Albert F. Madden
by Duncan & Page
Attorneys.

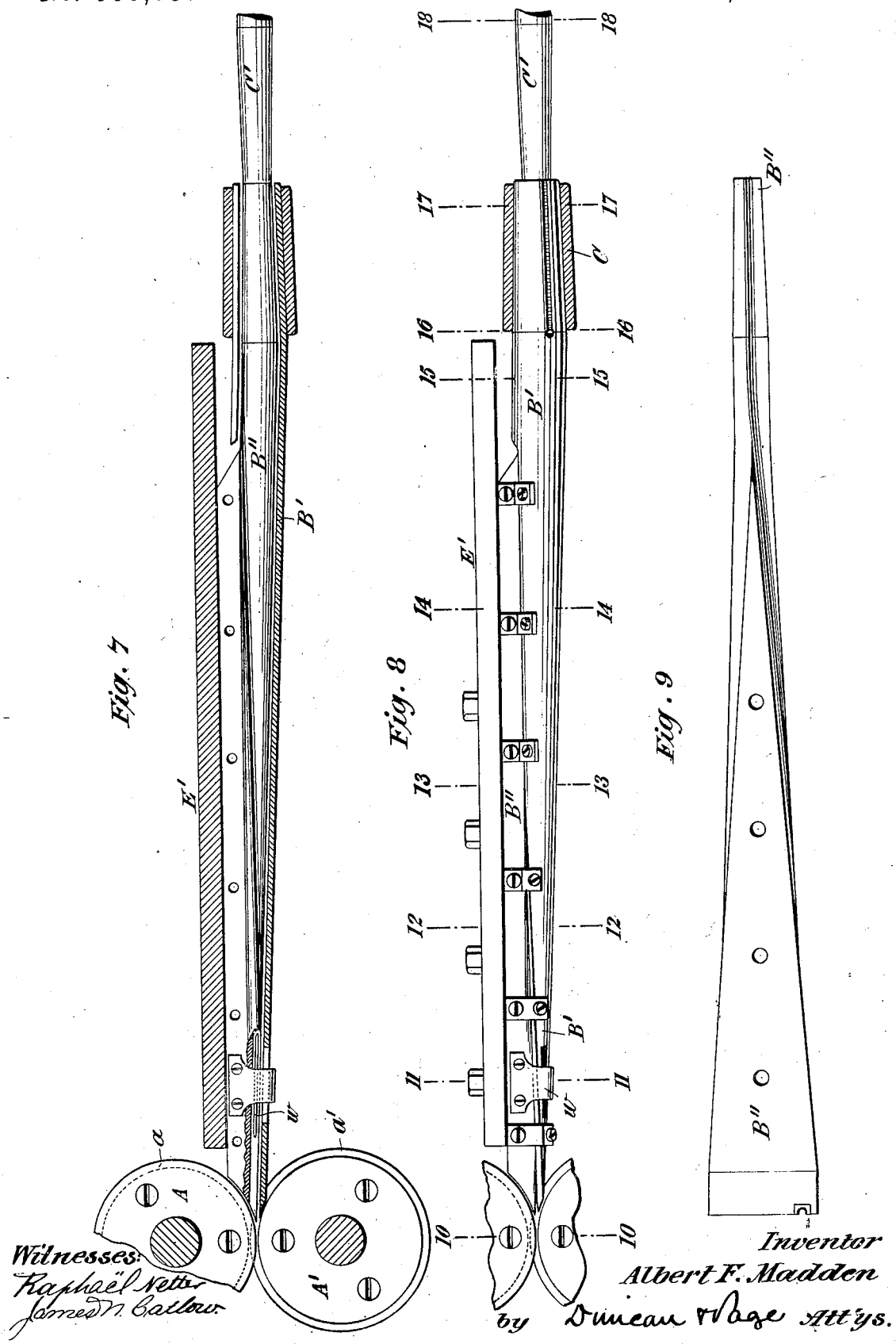

(No Model.) 6 Sheets—Sheet 6.
A. F. MADDEN.
MACHINE FOR MAKING METAL SHADE ROLLERS.
No. 556,857. Patented Mar. 24, 1896.
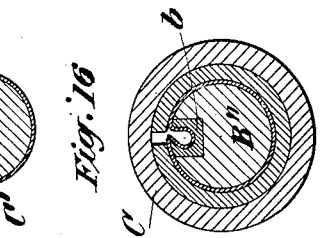
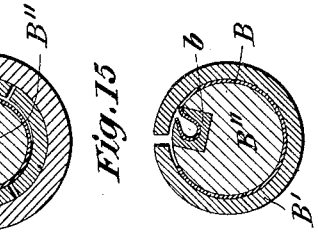
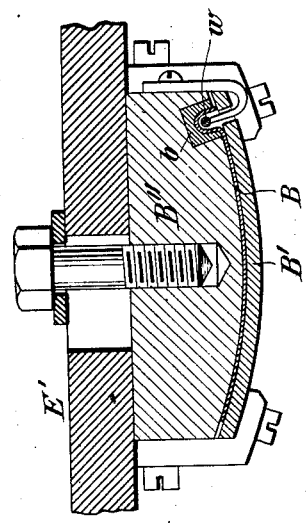
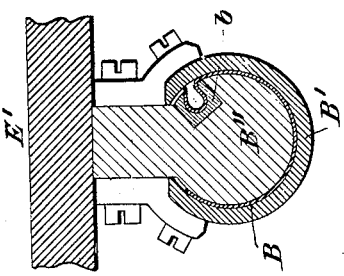
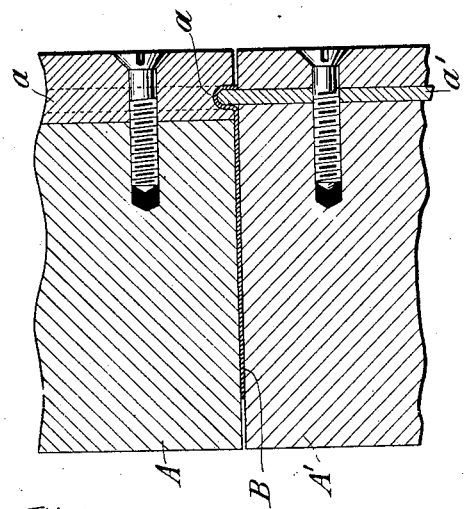
Witnesses:
Raphaël Netter
James M. Catlow
Inventor
Albert F. Madden
by Duncan & Page.
Attorneys

UNITED STATES PATENT OFFICE.

ALBERT FRANKLIN MADDEN, OF NEWARK, ASSIGNOR TO AUGUSTUS G. WINTERS, OF STILLWATER, NEW JERSEY.

MACHINE FOR MAKING METAL SHADE-ROLLERS.

SPECIFICATION forming part of Letters Patent No. 556,857, dated March 24, 1896.

Application filed April 11, 1895. Serial No. 545,274. (No model.)

*To all whom it may concern:*

Be it known that I, ALBERT FRANKLIN MADDEN, a citizen of the United States, residing at Newark, in the county of Essex and State of New Jersey, have invented a new and useful Machine for Making Metal Shade-Rollers, of which the following is a specification, reference being had to the drawings accompanying and forming a part of the same.

The well-known form of shade-roller, to the art of manufacturing of which the present invention pertains, is a tube formed with a longitudinal groove or open slot into which the edge of the curtain or shade is inserted and in which it is secured and its attachment to the roller effected by a rod, strip or other device forced or passed into the said groove. When these shade-rollers are made of sheet metal, such as tin, they are composed practically of two tubes, one constituting the roller proper, the other and smaller within the first and constituting the groove, the longitudinal slot or opening into the same being common to both the large and small tube. The manufacture of these shade-rollers, in consequence of the peculiar characteristic of being composed practically of two tubes, has been rendered a matter of difficulty and expense, mainly from the handwork and manipulation which their production has heretofore involved.

My present invention is in a machine which will convert sheet-metal blanks or strips into shade-rollers of the kind described at one, or by a continuous, operation and is, as I believe, the first machine capable of accomplishing this or a similar result which has been produced.

The machine in the form in which I have constructed and operated it, and in which it will serve as an illustration of the principles of construction and operation upon which the invention is based, is shown in the accompanying drawings, to which I now refer.

Figure 2:
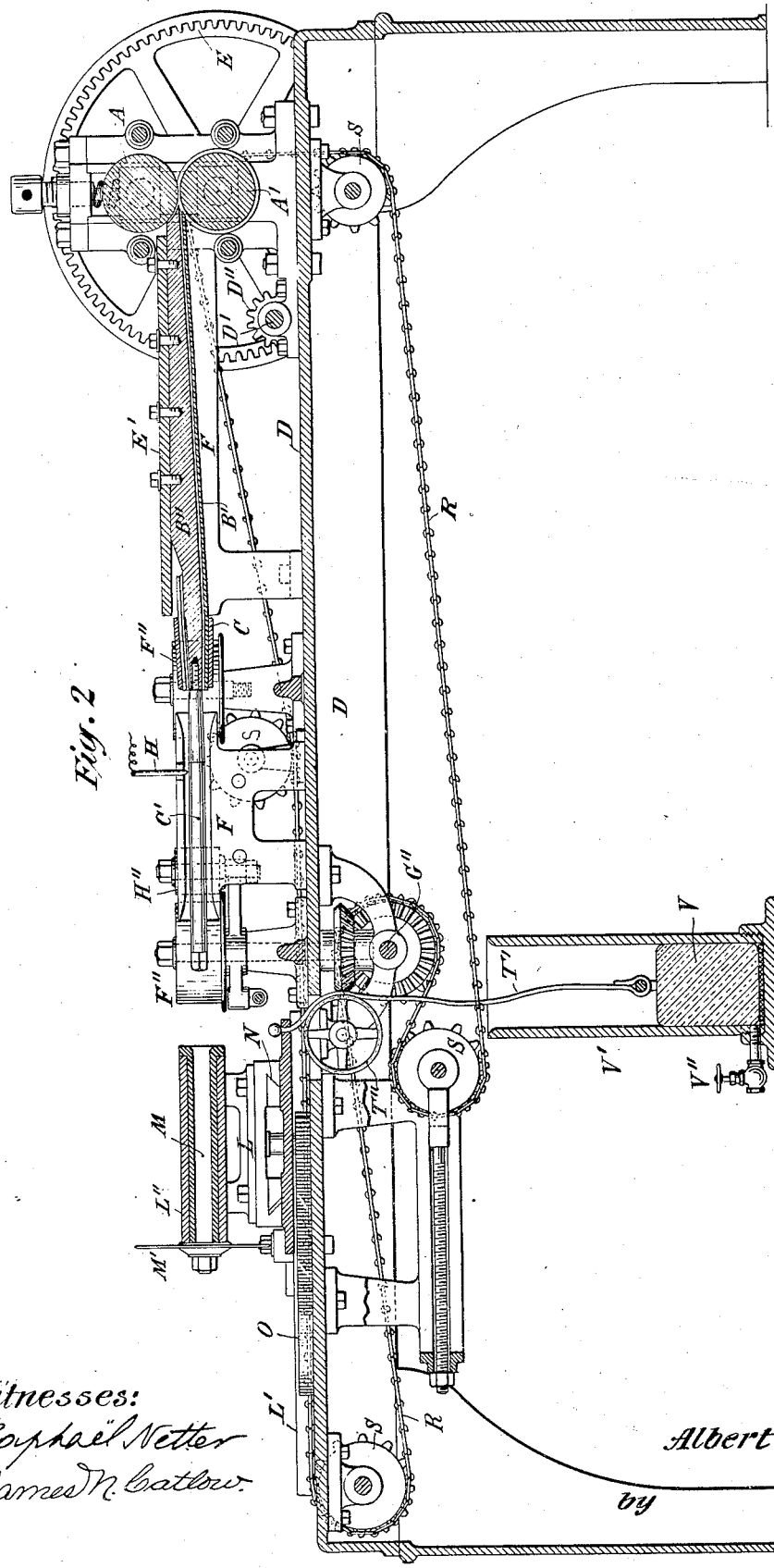
Figure 6:
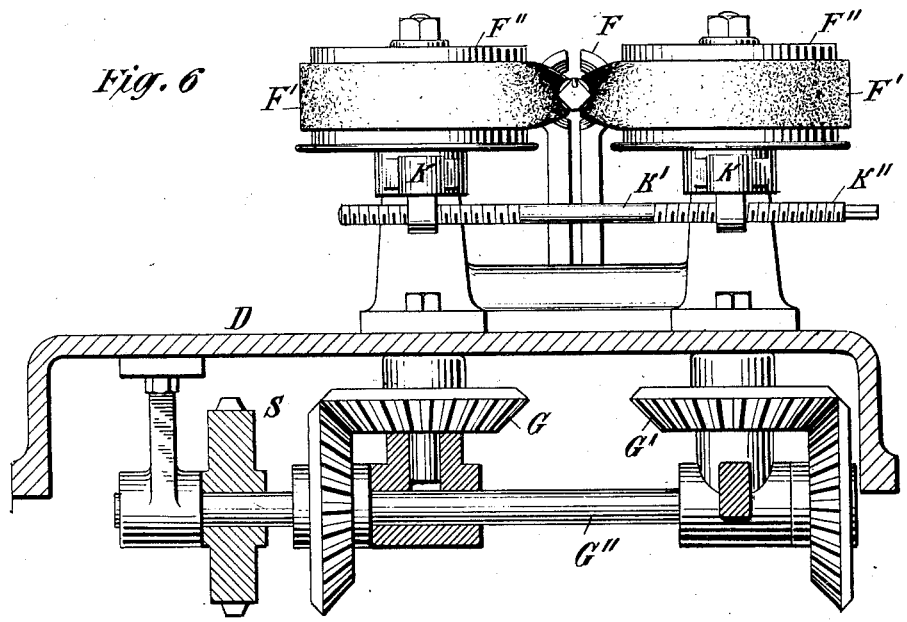
Figure 19:
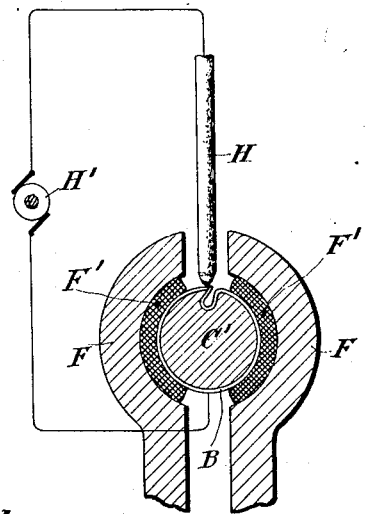
Figure 20:
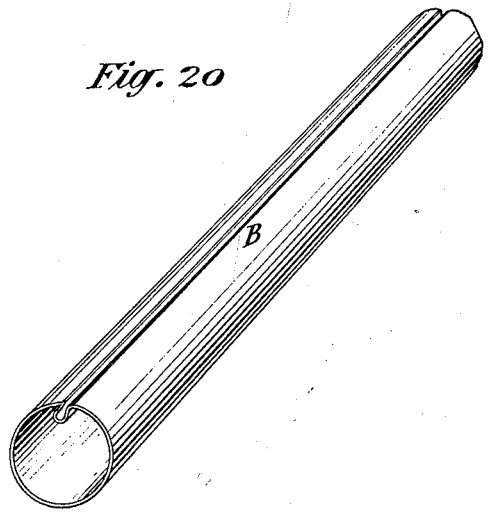

Figure 1 is a top plan view of the complete machine. Fig. 2 is a vertical section of the same on line 2 2 of Fig. 1. Fig. 3 is an enlargement of a portion of the section of Fig. 2, but with the tube-cutting mechanism shown in elevation. Fig. 4 is a cross-section, on an enlarged scale, on line 4 4 of Fig. 1. Fig. 5 is a plan view of a detached part of the mechanism hereinafter described. Fig. 6 is an enlarged cross-section on line 6 6 of Fig. 1. Fig. 7 is an enlarged view of a section of a portion of the mechanism on the line 2 2 of Fig. 1, but showing in elevation other parts as viewed from the opposite side of the machine to that exposed in Fig. 2. Fig. 8 is a side elevation, looking in the same direction, of the parts shown in section in Fig. 7. Fig. 9 is a top view of the mandrel shown in Figs. 7 and 8. Figs. 10 to 18, inclusive, are enlarged sectional views of the parts shown in Fig. 8 on the section-lines designated by numerals corresponding to the numbers of the said figures, respectively. Fig. 19 is an enlarged section on line 19 19 of Fig. 1 and a diagram showing the means for welding the edges of the tube. Fig. 20 is a perspective view of the completed shade-roller.

Considering for the present Figs. 7 to 18, inclusive, as illustrating the main features of the tube-forming portions of the machine, let it be assumed that A A' designate a pair of rolls, in one of which, as A', is set a steel disk a', which constitutes a tongue or die for a groove or matrix a in the other roll. The edge of said disk is rounded, and the groove is correspondingly formed, as shown in Fig. 10.

Let it be further assumed that the end of a strip B of sheet metal, such as tin, be introduced between the rolls A A', which, being adjusted to a proper distance apart according to the thickness of the metal, grip the latter and force it forward. In its passage between the rolls the strip will be forced into the groove $a$ by the circumferential tongue $a'$ and a corrugation or bead formed along its edge.

Issuing from the rolls the metal strip with its single corrugation passes between a tube-former B' and a mandrel B'', by means of which the flat corrugated strip is transformed into the sectional shape of the completed shade-roller.

Generally speaking, machines for converting flat strips of paper or metal into tubes by means of a former and mandrel are well known, so that an extended detailed description of this portion of the mechanism which involves the general principles of such machines is rendered unnecessary. It will, however, be observed that not only is the flat strip in the present case to be converted into a tube, but that the bead or corrugation along its edge must also undergo a similar transformation, and as these operations progress simultaneously, the small tube being developed, while the metal of which it is composed is constantly changing its relative circumferential position, it is necessary to provide for various conditions not met with in previously-existing machines. In carrying out my invention in this particular, I therefore cut a spiral groove in the mandrel B" and insert therein a hardened steel former $b$, which receives and shapes the corrugation or bead, while the main former and mandrel shape the strip as a whole.

To facilitate and render more practical the operation of connecting the corrugation in the strip into the desired form of a nearly-closed internal tube, I secure to the main former or to any proper stationary support a small supplemental mandrel $w$ within the former $b$. This mandrel need not extend the entire length of the former $b$, but only sufficiently to impart to the metal of the corrugation its approximate shape.

The progressive shaping of the strip by the devices described will be understood by reference to Figs. 11 to 18, which show the gradual changes in the shape of the mandrel and formers and the relative positions of the smaller former. It will be noted, however, that when the metal strip has reached the point indicated in Fig. 15 the main former is practically a complete tube and that both it and the mandrel are at this point and for some distance beyond projections or extensions from the directly supported portions of these two elements, respectively.

The metal strip or tube at the point indicated by Fig. 16 has been brought approximately to the diameter and shape which it is to ultimately retain, and no further shaping would be necessary but for the difficulty of uniting its edges and maintaining their union against the inherent resilience of the metal. To obviate this difficulty the mandrel B" from this point for a given distance is tapered or gradually reduced in diameter and the former is also contracted, as by being slit and compressed by a ferrule C, so that at a given point farther on, at or near the end of the former B', the flat edge of the strip B will overlap the other edge for a considerable distance, as shown in Fig. 17. From this point on the mandrel B" is extended by a guide-rod C' screwed into its end and which gradually enlarges to the ultimate internal diameter of the complete tube, so that as the tube passes over the part C' it is brought back to a shape in which the spring of the metal tends to preserve it, so that its edges may be then joined with little difficulty.

The flat strip of sheet metal is by the above means converted into the form of a tubular shade-roller of the same length as the strip. The devices employed for this purpose may be constructed, supported, and arranged in any proper manner, or as is shown in Figs. 1 and 2, where D is the bed or frame of the machine and D' a pulley-shaft provided with a pinion D" that meshes with a cog-wheel E on the shaft of the under roll A'. The power thus communicated to the rolls forces the strip of metal forward through the former B'. The said former and the mandrel B" are supported in any suitable manner, as from a frame or table E' secured to the bed-plate D.

Forward of the end of the former B" or ferrule C and surrounding the extension C' of the mandrel is a guide F, made in two parts, supported on the bed-plate D, and through or between which run the endless belts F' F' carried around the pulleys F''', two of which are driven by the bevel-wheels G G', receiving motion from a suitable countershaft G". The belts F' are composed of or contain a suitable material, such as felt, which will grip the tube B and assist in drawing it forward and at the same time serve to properly align its edges, so as to facilitate their union. Any proper means may be employed for effecting this union; but I have shown (see Figs. 2 and 19) a carbon pencil H, which is caused to enter an opening in the guide F and to touch or closely approach the tube B along the line of its abutting edges. An electric circuit is established from the metal tube to the carbon pencil through a suitable generator H', by means of which a small arc is maintained between the pencil and the abutting edges of the tube which fuses and welds the latter together.

Two idle-pulleys H" are supported on pivotal arms K, which latter are adjusted to vary the tension of the belts F' by means of a rod K' with right and left hand threads K" at its ends which engage with the free ends of the levers or arms K.

The tube B issues from the guide F and passes off from the guide or extension C' as a completed double tube of the proper form. It remains only to cut the same into proper lengths for use as shade-rollers, and the means which I have devised for this purpose are as follows:

L is a table mounted to travel in the direction of the axis of the tube on the ways L' and having a standard L", formed as a guide with a wooden bushing M, which permits the tube B to pass through it.

On a shaft mounted in bearings on the table and parallel with the axis of the bushing M is a cutter M', such as a circular saw, and said shaft with its bearings and supports is mounted on dovetail guides N, so as to be capable of movement at right angles to the axis of the bushing or the metal tube B.

A pulley W is fixed to the cutter-shaft and is made in such form that it may be driven by a belt while changing its position.

A stud N' fixed to the under side of the support or carriage of the cutter extends through a slot N'' in the bed-plate or table L and engages with a cam track or groove O fixed to the main bed D of the machine.

A tongue O' is pivoted in the cam-track, as shown in Fig. 5, to serve as a switch and direct the movement in said track of the stud N'.

From the construction and arrangement of the parts described it will be seen that if the bed L of the cutter be moved forward on its guides L' the engagement of the stud N' with the cam-track O will cause the cutter-carriage to advance toward the tube B or the bushing, through which it passes by a slow movement through a given part of the forward movement of the main carriage, and then to recede by a quicker movement during the time that the stud N' traverses the part P of the cam. If, therefore, the carriage L be advanced at the same rate of speed as that at which the tube B is moving, the cutter will cut off a length of such tube in each advance movement. To secure the proper movements of the carriage L, I carry a drive-chain R from a sprocket-wheel R' on the driven roller-shaft around idle or guide sprockets S S S and under the carriage L. At suitable distances apart the links of the chain are enlarged, as shown at Fig. 1, or so formed as to engage with the carriage L and draw the same along until the downward movement of the chain around the sprocket-wheel, placed near the desired limit of travel of the carriage, releases the latter and allows it to be drawn back to its starting-point by a cord T' running over a pulley or drum T'' and attached to a weight V. To prevent the too quick return of the carriage, the weight V is fitted in a cylinder V', which is provided with a cock V'' to regulate the escape and admission of air. It will be seen that by this means the cutter is moved longitudinally with the tube by the forward movement of the carriage L while in engagement with the drive-chain; that at the same time the cutter is moved transversely to the tube and toward the same by a slow motion while the stud N' is passing over the part O of the cam; that it is then moved quickly away from the tube while the stud N' moves over the part P of the cam, and that it is not moved in either transverse direction during the return movement of the carriage L and while the stud N' travels along the part P' of the cam.

The specific construction of the various elements or parts of the machine which I have now described may be very greatly varied, and the elements themselves may be used not only for the specific purpose herein described, but for any other purpose or in any other combination for which, by these peculiar functions, they are adapted.

I desire to make it plain that I have merely intended by the specification and drawings accompanying this application to illustrate the invention in the best and most practicable form of which I am aware; but I understand that my invention includes many variations and modifications of this preferred form. For instance, I regard as within my invention any mechanism for simultaneously forming the compound tube or shade-roller from a metal strip, which combines one former within another whether the interior or smaller tube-former be located so as to form the inner tube along the edge of the blank or elsewhere, or whether the internal former be spirally disposed or otherwise.

Without limiting myself in the particulars referred to, what I claim as new, and desire to secure by Letters Patent, is—

1. In a machine for forming shade-rollers from sheet metal the combination with a main former and a mandrel contained therein adapted to bend a substantially flat strip into the form of a tube, of a second former adapted to convert a single portion of the strip or blank into the form of a smaller tube with a longitudinal opening during its passage through the main former, as set forth.

2. In a machine for forming shade-rollers from sheet metal by a single and continuous operation, the combination with a main former and a mandrel contained therein adapted to bend a substantially flat strip into the form of a tube, of a second tube-former in the body of the mandrel, through which a single portion of the strip passes and by which it is converted into a smaller slotted tube within the main tube, as set forth.

3. In a machine for forming shade-rollers from sheet metal, the combination with a tube-former and a mandrel contained therein for bending a substantially flat strip into tubular form, of a second tube-former for converting a single portion of the strip into the form of a smaller tube with a longitudinal opening therein, said second former extending spirally in the mandrel, as set forth.

4. In a machine for forming shade-rollers from sheet metal, the combination with a tube-former and a mandrel contained therein for bending a substantially flat strip into tubular form, of a second tube-former extending longitudinally through substantially the entire length of said mandrel and adapted to convert a single portion of the strip into the form of a smaller tube with a longitudinal opening therein, as set forth.

5. In a machine for forming shade-rollers from sheet metal, the combination with a tube-former, a mandrel contained therein, a second tube-former extending longitudinally through the said mandrel and adapted to receive a single portion of the strip of sheet metal and convert it into a tube with a longitudinal opening, and a second mandrel contained within the second tube-former, as set forth.

6. The combination with a tube-former, a mandrel contained therein and a second tube-former extending longitudinally through the mandrel of the feed-rolls A, A' formed substantially as set forth, with a tongue and groove, to form a corrugation or bead along the edge of a metal strip before it passes into the former, as described.

7. The combination with a tube-former and mandrel changing from a flat to circular form and then reduced in diameter so as to cause the edges of a strip passed through the former to overlap beyond the necessary limits, for the purpose of counteracting the effect of the spring of the strip, as described.

8. The combination with a tube-former and mandrel constructed to form a metal strip into a tube with overlapping edges, of a guide forming an extension to the mandrel and gradually enlarged whereby the tube in passing over the same from the mandrel will be expanded until its edges abut, as set forth.

9. In a machine for forming shade-rollers from sheet metal, the combination with two tube-formers adapted to simultaneously and continuously convert a substantially flat strip into a shade-roller of the kind described, of pressure-rolls adapted to force the unbent metal strip forward into and through the said formers, as set forth.

10. The combination with a former adapted to bend a flat metal strip longitudinally into tubular form of presser-belts for aligning the edges of the tube after it has issued from the former and means for uniting the edges of said tube, as set forth.

11. The combination with a former for bending a strip of metal longitudinally into tubular form, a guide over which the tube is passed, means, such as presser-belts, for maintaining the edges of the tube in proper alignment and means for fusing and welding said edges, as set forth.

12. The combination of tube-former changing from a flat to circular shape and having an extension of reduced diameter, and a mandrel contained within the same and conforming to the shape of the former, and having an extension beyond the former of increasing diameter, as set forth.

13. The combination with the presser-rolls, the former and mandrel, for shaping and converting a flat strip into tubular form, of a cutting device movable in the direction of the feed of the tube, and also transversely thereto, and a drive-chain moving at the same rate as the tube and having projections or suitably-shaped links adapted to periodically engage with and advance the cutting mechanism, as set forth.

14. The combination with the cutting mechanism, the drive-chain with parts or links adapted to engage with the cutting mechanism during a portion of their course of movement and to advance the said mechanism while such engagement continues, of a retracting device such as a cord-pulley and weight for restoring the cutting mechanism to position when released by the drive-chain, as set forth.

In testimony whereof I have hereunto set my hand this 1st day of April, 1895.

ALBERT FRANKLIN MADDEN.

Witnesses:
PARKER W. PAGE,
ROBT. F. GAYLORD.